(12) United States Patent
Vivier et al.

(10) Patent No.: US 11,829,043 B2
(45) Date of Patent: Nov. 28, 2023

(54) INTEGRATED GLAZING UNIT WITH ELECTRONIC DEVICE

(71) Applicants: AGC GLASS EUROPE, Louvain-la-Neuve (BE); AGC INC., Chiyoda-ku (JP); AGC FLAT GLASS NORTH AMERICA INC., Alpharetta, GA (US); AGC VIDROS DO BRASIL LTDA, Guaratingueta (BR)

(72) Inventors: Jonathan Vivier, Beuzet (BE); Olivier Bouesnard, Ittre (BE)

(73) Assignees: AGC GLASS EUROPE, Louvain-la-Neuve (BE); AGC Inc., Chiyoda-ku (JP); AGC FLAT GLASS NORTH AMERICA, INC., Alpharetta, GA (US); AGC VIDROS DO BRASIL LTDA, Guaratingueta (BR)

( * ) Notice: Subject to any disclaimer, the term of this patent is extended or adjusted under 35 U.S.C. 154(b) by 731 days.

(21) Appl. No.: 16/965,212

(22) PCT Filed: Jan. 29, 2019

(86) PCT No.: PCT/EP2019/052080
§ 371 (c)(1),
(2) Date: Jul. 27, 2020

(87) PCT Pub. No.: WO2019/149682
PCT Pub. Date: Aug. 8, 2019

(65) Prior Publication Data
US 2020/0355975 A1 Nov. 12, 2020

(30) Foreign Application Priority Data

Jan. 30, 2018 (EP) .................................. 18154021

(51) Int. Cl.
*G02F 1/161* (2006.01)
*B32B 17/10* (2006.01)
(Continued)

(52) U.S. Cl.
CPC ...... *G02F 1/1533* (2013.01); *B32B 17/10174* (2013.01); *B32B 17/10761* (2013.01);
(Continued)

(58) Field of Classification Search
CPC ...... G02F 1/1533; G02F 1/161; G02F 1/1345; B32B 17/10174; B32B 17/10761;
(Continued)

(56) References Cited

U.S. PATENT DOCUMENTS

| 4,977,716 A | * | 12/1990 | Hawkins | ................. E04D 3/08 52/235 |
| 2016/0200077 A1 | * | 7/2016 | Crook | ..................... C08K 3/16 428/432 |

(Continued)

FOREIGN PATENT DOCUMENTS

| WO | WO 2016/100075 A1 | 6/2016 |
| WO | WO 2017/027407 A1 | 2/2017 |

OTHER PUBLICATIONS

International Search Report dated Feb. 15, 2019 in PCT/EP2019/052080 filed on Jan. 29, 2019.

*Primary Examiner* — Mustak Choudhury
(74) *Attorney, Agent, or Firm* — Oblon, McClelland, Maier & Neustadt, L.L.P.

(57) ABSTRACT

An integrated glazing unit (IGU) includes a first pane, an electronic laminate that includes an electronic device provided between first and second substrates, a plurality of terminals coupled to the electronic device, and the first substrate being attached to the first pane. The IGU also includes a second pane coupled to the electronic laminated (Continued)

assembly by a spacer, the spacer being recessed with respect to the laminate edge and the second pane edge, forming an interpane volume, R, between the first and second panes. The IGU further includes a gutter having an open face and giving access to an inner volume, Vi. The gutter is positioned within the interpane volume, R, with the open face being recessed from, flush with or extending by less than 10 mm from the second pane edge. The gutter is suitable for receiving the male and/or female electric connector of a cable harness in the inner volume, Vi.

20 Claims, 6 Drawing Sheets

(51) Int. Cl.

| | |
|---|---|
| G02F 1/153 | (2006.01) |
| B32B 27/30 | (2006.01) |
| E06B 3/663 | (2006.01) |
| E06B 3/67 | (2006.01) |
| E06B 3/673 | (2006.01) |
| E06B 9/24 | (2006.01) |
| G02F 1/1345 | (2006.01) |
| H01R 13/405 | (2006.01) |
| E06B 3/66 | (2006.01) |

(52) U.S. Cl.
CPC ........ *B32B 27/306* (2013.01); *E06B 3/66352* (2013.01); *E06B 3/6722* (2013.01); *E06B 3/67343* (2013.01); *E06B 9/24* (2013.01); *G02F 1/1345* (2013.01); *G02F 1/161* (2013.01); *H01R 13/405* (2013.01); *B32B 2250/40* (2013.01); *B32B 2419/00* (2013.01); *E06B 3/6612* (2013.01); *E06B 2009/2464* (2013.01)

(58) Field of Classification Search
CPC .............. B32B 27/306; B32B 2250/40; B32B 2419/00; E06B 3/66352; E06B 3/6722; E06B 3/67343; E06B 9/24
See application file for complete search history.

(56) References Cited

U.S. PATENT DOCUMENTS

2018/0011383 A1* 1/2018 Higashihara ...... B32B 17/10513
2018/0024408 A1* 1/2018 Strong .................... G02F 1/153
359/275

* cited by examiner

INTEGRATED GLAZING UNIT WITH ELECTRONIC DEVICE

FIELD OF THE INVENTION

The invention relates to an integrated glazing unit (IGU) comprising an electronic device provided between the first and the second panes of the IGU. In particular, it relates to the electric connection of the electronic device and specifically, to the positioning of the cable harness, coming out at an edge of the IGU.

TECHNICAL BACKGROUND

In the building, automotive, aviation and other industries, laminated glass panels with integrated electronic components, such as electrochromic device, switchable films, light emitting device, photovoltaic cells, displays and/or a heating facility are known, e.g. for displaying information, lighting purposes, aesthetics reasons as well as for energy-savings. In particular, electrochromic devices, which change in optical transmissivity as a result of applied voltage and current, are in use today in electrochromic windows and in automotive mirrors.

To provide thermal insulation for the building, windows are often made as integrated glazing units (IGUs) and have a first glass sheet and a second glass sheet held apart by a spacer. A secondary seal typically surrounds the spacer. This works well for integrated glazing units of ordinary windows without electronic devices, with the spacer and the secondary seal hermetically sealing the two sheets of glass and preventing moisture condensation in the inner space between the two panes. When an ordinary sheet of glass is replaced by an electronic laminate, the electric connections to the terminal(s) of electronic devices pose design challenges, in an integrated glazing unit that should maintain hermetic sealing.

Indeed, the manufacturing of an electronic laminate with electronic components typically comprises the steps of depositing a conductive layer on a first substrate, realization of electronic circuits in the conductive layer and depositing of electronic components on the conductive layer, connected to the electronic circuits. The laminate is obtained by the application of the second substrate, which is then laminated. In each of these electronic laminate, it is necessary to furnish an electric supply to the conducting layer for supplying electrical power to the electronic device. In some applications, it is also required to monitor the electronic device through a signal connection. These power and signal connections can be made in the following way. The cables or a junction connector can be connected to the conductive layer or directly to the electronic circuits. Then the assembly follows the same process of lamination as described above. The cable harness ending with a male or female electric connector, exits the laminate at a side edge.

The cable and/or junction connector and the connection to the electronic component or conductive layer hereinafter referred to as "connectics", are very fragile. They can get easily damaged during the manufacturing process which can lead to bad contacts or complete contact losses. For example, FIG. 1A shows an example of the manner in which an IGU comprising an electronic laminate may be transported during its fabrication process. As shown in FIG. 1A, two IGUs may be transported and handled on a transport system (29), in a manner in which an IGU rests on its edge. For example, transport system may include a number of rollers such that IGUs may easily be translated along an assembly or testing line. Handling an IGU in a vertical manner (i.e., with the IGU resting on its edge) may have the advantage of the IGU having a smaller footprint on a manufacturing floor. During transport on transport system, the cable harness and/or connector, although sized to avoid contact with transport system, may catch on other features of a fabrication facility or be inadvertently held while the IGU is still moving along transport system. Furthermore, the cable harness and/or connector be inadvertently detached from the IGU or otherwise damaged. This may include damaging the wiring within the secondary seal of the IGU. In case of any damages, it is very difficult, if not impossible, to repair the integrated glazing unit or electronic laminate without delamination, i.e. destruction of the integrated glazing unit or electronic laminate. It is unacceptably expensive to dispose of the entire IGU as a result of damaging the external portions of the electric connection of the electronic laminate within the IGU.

Therefore, there is a technical challenge to design integrated glazing units comprising an electronic laminate, which protects the cable harness and/or connector coming out of the electronic laminate at a side edge, and to provide a method of production thereof, which is easy, highly reliable and efficient.

Furthermore, current commercial trend in building windows is to maximize luminosity and hence to maximize the surface allocated to the glass and to minimize the surface allocated to the frame. Frames are used indeed to integrate the glass panel within the building but as well to hide the electric connection and other functionalities of windows. Therefore, it is necessary to keep the size of the electric connection as small as possible to minimize the width of the frame.

It has been surprisingly found that positioning the male or female electric connector of the cable harness, preferably together with a portion of the cable harness, within the inner volume of a gutter located within the interpane volume, allows for an easy and safe handling and transport of the electronic laminate IGU. Moreover, it allows reducing the space taken by the male and/or female electric connector and/or the cable harness extending beyond the edge of the IGU and therefore the size of the frame necessary to hide such connectics.

When an IGU comprising an electronic laminate is placed in situ, it will be electrically coupled to the controller assembly, driver and/or the power supply. It has been surprisingly found that the gutter may therefore receive as well, the corresponding female and/or male electric connector of the controller, driver and/or the power supply cable. The electric coupling via the corresponding male and female electric connectors, can then be achieved within the inner volume of the gutter. Hence, only the cable harness of the controller assembly, driver and/or the power supply, will need to pass through the frame. Indeed, this electric connection within the gutter allows reducing significantly, the size of the opening within the frame required for the connectics passage: the connector has for example a diameter higher than 12 mm whereas the cable has a diameter smaller than 10 mm. Minimizing the opening within the window frame is highly advantageous to keep the watertightness, mechanical and thermal properties of the frame.

SUMMARY OF THE INVENTION

The present invention relates to an integrated glazing unit (IGU), comprising:

(a) a first pane comprising a first pane edge, extending along a longitudinal axis, X;
(b) an electronic laminate comprising:
a first substrate,
a second substrate,
an electronic device provided between the first and second substrate,
a plurality of terminals coupled to the electronic device,
a laminate edge extending along the longitudinal axis X and being recessed with respect to the first pane edge; and
wherein the first substrate is attached to the first pane;
(c) a cable harness connected to the terminals and ending with a male and/or female electric connector;
(d) at least a second pane comprising a second pane edge extending along the longitudinal axis, X, and coupled to the electronic laminated assembly by a spacer maintaining a distance between the electronic laminate and the second substrate, said spacer being recessed with respect to the laminate edge and the second pane edge, forming a interpane volume, R, between the first and second panes.

According to the present invention, the IGU comprises a gutter:
comprising an open face defined by a length, L, measured parallel to the longitudinal axis, X, a width, W, and a depth, D; said open face extending along the length, L, and giving access to an inner volume, Vi;
being positioned within the interpane volume, with the open face being recessed from, flush with or extending by less than 10 mm, preferably less than 6 mm, more preferably less than 2 mm, from the second pane edge.

According to the present invention, the gutter is suitable for receiving the male and/or female electric connector in the inner volume, Vi, preferably with a portion of the cable harness.

The present invention further relates to method of producing said integrated glazing unit (IGU) comprising the steps of:
laminating the electronic device to the first substrate and second substrate;
attaching the electronic laminate to the first pane;
attaching the second pane, to the spacer for maintaining a distance between the second pane and the second substrate;
connecting the cable harness to at least a portion of the terminals of the electronic laminate;
positioning the gutter within the interpane volume, by pressing the gutter into the sealing material before it has set, such that gutter is recessed from, flush with or extending by less than 10 mm, preferably less than 6 mm, more preferably less than 2 mm from the second pane edge;
positioning the electric connector, preferably with a portion of the cable harness, into the inner volume, Vi; and
filling the interpane volume, R, with a sealing material.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

For purposes of explanation, a lateral direction is considered parallel to a plane of, or tangent to, a main body of the integrated glazing unit, and a vertical direction is considered perpendicular to the main body of the integrated glazing unit, e.g., through a thickness of the integrated glazing unit and/or extending perpendicular to a major surface of the integrated glazing unit.

Figure 3A:
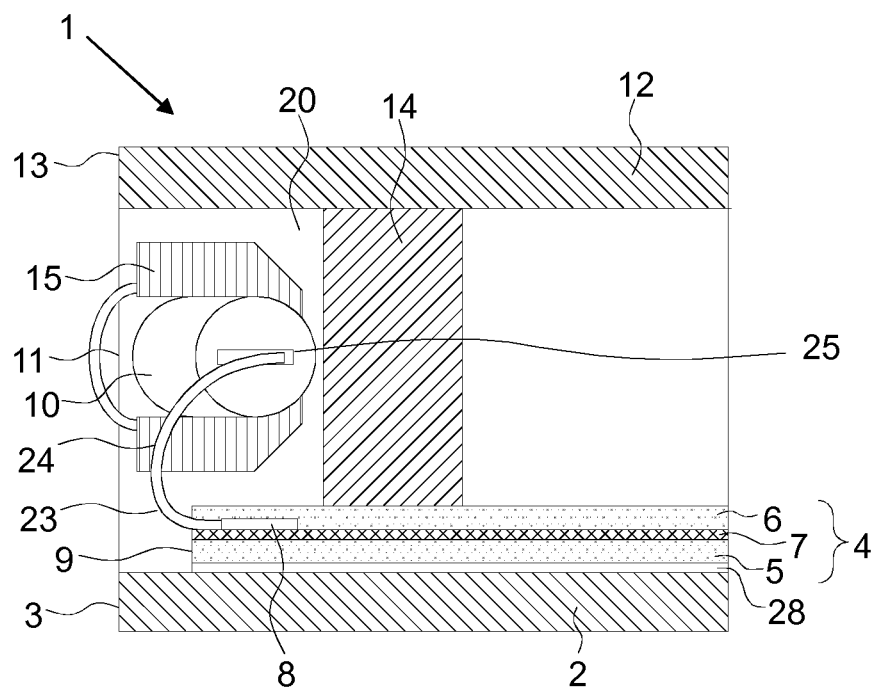
FIG. 3A is a schematic cross-section view of an integrated glazing unit comprising an electronic laminate, a spacer, first and second glass sheets, a gutter and a cable harness with a male or female connector according to one embodiment of the present invention.
Figure 3B:
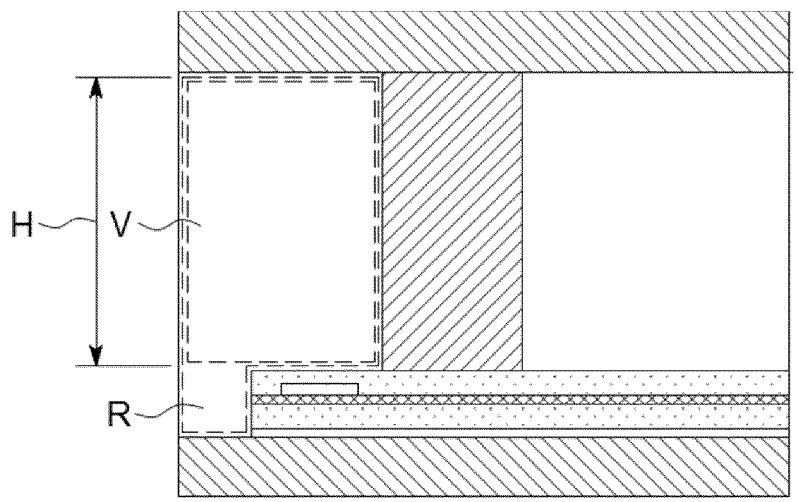
FIG. 3B is a schematic cross-section view of an integrated glazing unit comprising an electronic laminate, a spacer, first and second glass sheets; illustrating the interpane volume, R, the coupling volume, V, and the height of the spacer, H.

As seen in FIG. 3 A et B, the present invention relates to an integrated glazing unit (IGU) (1), comprising:
(a) a first pane (2) comprising a first pane edge (3), extending along a longitudinal axis, X;
(b) an electronic laminate (4) comprising: a first substrate (5), a second substrate (6), an electronic device (7) provided between the first and second substrate, a plurality of terminals (8) coupled to the electronic device, a laminate edge (9) extending along the longitudinal axis X and being recessed with respect to the first pane edge; and wherein the first substrate is attached to the first pane;

(c) a cable harness (10) connected to the terminals and ending with a male or female electric connector (11);

(d) at least a second pane (12) comprising a second pane edge (13) extending along the longitudinal axis, X, and coupled to the electronic laminated assembly by a spacer (14) maintaining a distance between the electronic laminate and the second substrate, said spacer being recessed with respect to the laminate edge and the second pane edge, forming a interpane volume, R, between the first and second panes.

Figure 2:
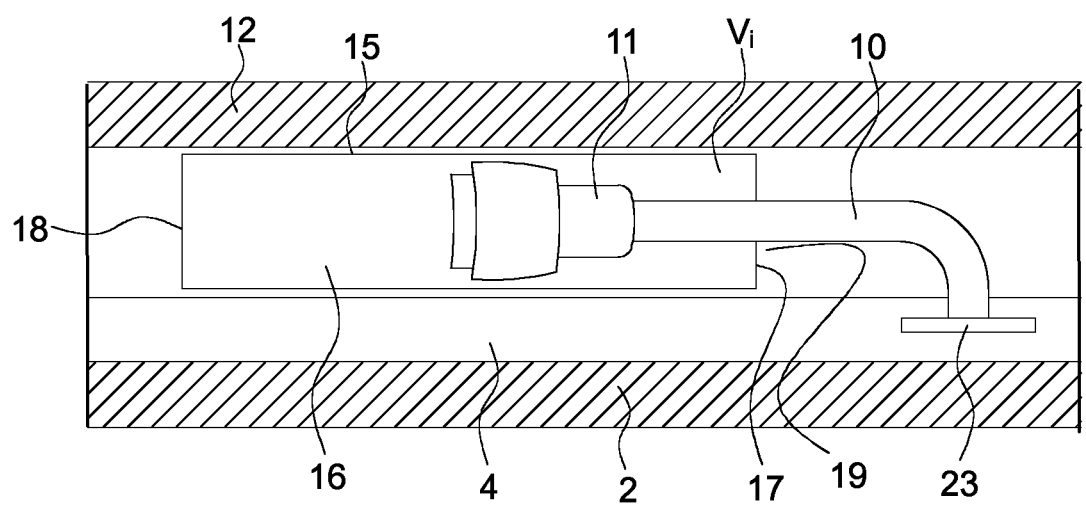
FIG. 2 is a top view of an integrated glazing unit comprising an electronic laminate according to the present invention, showing a cable harness and its male or female electric connector located within a gutter in accordance with some embodiments.

As illustrated in FIG. 2, the IGU of the present invention comprises further a gutter (15), comprising an open face (16) defined by a length, L, measured parallel to the longitudinal axis, X, a width, W, and a depth, D; said open face extending along the length, L, and giving access to an inner volume, V. Said gutter is suitable for receiving the male or female electric connector and preferably together with a portion of the cable harness in the inner volume, Vi, and is positioned within the interpane volume, R, with the open face being recessed from, flush with or extending by less than 10 mm, preferably less than 6 mm, more preferably less than 2 mm, from the second pane edge.

Like many ordinary integrated glazing units, the integrated glazing unit (1) of the present invention (also referred to herein as IGU) is thermally insulative. According to FIG. 3A, the IGU (1) of the present invention comprises a first pane (2) comprising a first pane edge (3), an electronic laminate (4), a spacer (14) and a second pane (12) comprising a second pane edge (13). The first pane and second pane are parallel to each other. Each pane could be glass or plastic or other transparent or translucent material.

The electronic laminate comprises a first substrate (5), a second substrate (6), an electronic device (7) provided between the first and second substrate, a plurality of terminals (8) coupled to the electronic device and a laminate edge (9) recessed with respect to the first pane edge of the IGU. The electronic laminate is attached to the first pane of the IGU along the first substrate (5). The second pane and attached to the spacer (14) maintaining a distance between the second pane (12) and the second substrate (6) of the electronic laminate (4), said spacer (14) being recessed with respect to the laminate edge (9) and the second pane edge (13). Preferably a third pane is provided between the second substrate (6) of the electronic laminate (4) and the said spacer (14).

The IGU (1) of the invention can have its first pane (2) as an outer pane or an inner pane, and the second pane (12) could be an inner pane or an outer pane, relative to an interior space of a building in which the IGU is installed. Preferably, the electronic device is placed closer to the outer pane. In particular for electrochromic devices, the device is preferably placed closer to the outer pane than the inner pane to allow the adjustable tinting of the electrochromic device to shade the inner pane and the space between the inner and outer panes, which decreases heating of the argon, nitrogen, air or other gas between the panes. In one embodiment, a seal material (20) surrounds the spacer (14) laterally and is referred to as the secondary sealant.

The first pane and the second pane of the IGU according to the invention can be made of glass, if so glass which can belong to various categories. The glass can thus be a glass of soda-lime-silica, aluminosilicate or borosilicate type, and the like. Preferably and for reasons of lower production costs, the glass sheet according to the invention is a sheet of soda-lime-silica glass. In a preferred embodiment of the present invention, the first pane (2) and/or second pane (12) and/or the third pane (21) are glass sheets preferably made of glass comprising strengthened soda lime glass having a thickness in the approximate range of about 3.0 mm to about 6.0 mm.

The glass sheet according to the invention can be a glass sheet obtained by a floating process, a drawing process, a rolling process or any other process known to manufacture a glass sheet starting from a molten glass composition. The glass sheet according to the invention can have a thickness varying between 0.1 and 25 mm. According to another embodiment of the present invention, an anti-reflective coating may be provided on the surface of glass sheet.

The thermoplastic interlayer to be used between the different laminated layers of the IGU of the present invention can be a material selected from the group consisting of ethylene vinyl acetate (EVA), polyisobutylene (PIB), polyvinyl butyral (PVB), polyurethane (PU), Cyclo Olefin Polymers (COP), an ultraviolet activated adhesive, and/or other transparent or translucent bonding material. Preferably the thermoplastic interlayer is a polyvinyl butyral layer.

Figure 4:
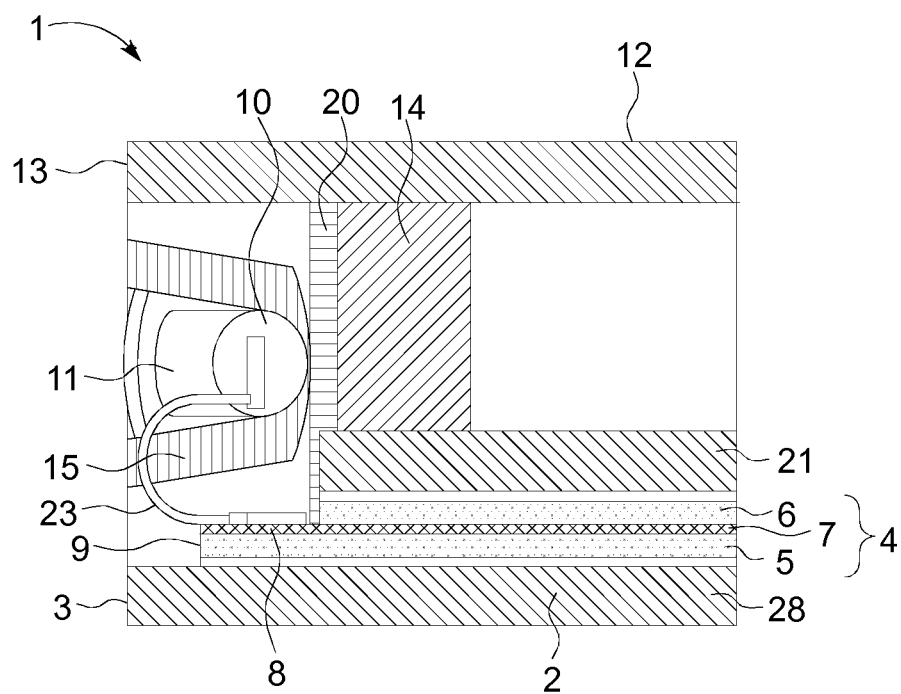
FIG. 4 is a schematic cross-section view of an integrated glazing unit comprising an electronic laminate, a spacer, glass sheets, a circuit board, a cable harness and its male or female electric connector located within a gutter, in accordance with some embodiments.

As shown in FIGS. 3 to 5, the gap or inner space between the second substrate (6) or the third pane (21) and the second pane (12) can be filled with argon, nitrogen, dry air or other gas, to provide thermal insulation as a general characteristic of integrated glazing units.

Although present embodiments are depicted as flat, further embodiments of the integrated glazing unit could use curved surfaces and materials, or angled surfaces, etc., and apply the mechanisms and arrangements described below.

According to FIGS. 3 to 5, the electronic laminate (4) comprises a first substrate (5), a second substrate (6), an electronic device (7) provided between the first and second substrate, and a plurality of terminals (8) coupled to the electronic device (7), wherein the edge of the laminate (9) is recessed with respect to the first pane edge (3) of the IGU. Such recess is advantageous to make the necessary electrical connections with the electronic device (7) of the electronic laminate (4) within the IGU but should be reduced as much as possible to minimize the size of the window frame that will be necessary to hide such electric connection, for aesthetic reasons.

The substrates (5, 6) of the electronic laminate may be a thin glass or flexible substrate, where the substrate has a thickness of 1.0 mm or less and more particularly 0.5 mm or less. The substrates may be glass, plastic, or other transparent or translucent material. In a preferred embodiment of the present invention, the first and second substrates comprise low CTE borosilicate glass having a thickness of 0.5 mm.

Methods for manufacturing laminates are well-known in the window industry since decades. A so-called sandwich of the first substrate, the electronic device and the second substrate is laminated in an automated laminating line by using the procedure of calendering and autoclaving.

In a preferred embodiment, the electronic laminate further comprise a first transparent conductive oxide layer, preferably a cathode layer, deposited on or otherwise attached to the first substrate (5); a first bus applied to the first substrate and the first transparent conductive layer; active electronic material layer; a second transparent conductive oxide layer, preferably an anode layer; deposited on or otherwise attached to the second substrate (6); and a second bus bar, applied to the second substrate and the second transparent conductive layer. The active electronic material layer can be an ion conductor for electrochromic device, suspended particles for Suspended Particle Devices, . . .

These layers could be fabricated or assembled in various ways, or variations could be devised. For example, the cathode layer could be deposited onto the first transparent conductive oxide layer, and the anode layer deposited onto the second transparent conductive oxide layer, with the ion conductor layer or electrolyte applied to either the cathode layer or the anode layer. Then, the two substrates (5, 6) could be brought together with the active electronic material layer in the middle, to form the electronic device. For example, the anode layer and the cathode layer may be applied by a wet process such as a sol-gel process or by the deposition of an ink containing electronic particles and the ion conductor layer may be a viscous polymer.

In one embodiment, a sealant is applied, as a ring around the edges of the electronic device (7), to seal the first substrate (5) and the second substrate (6) together and protect the electronic material from degradation due to exposure to moisture or atmosphere. Such sealant is referred to as the first sealant. Suitable sealants are polyvinylbutyral (PVB) or polyisobutylene (PIB).

The electronic device (7) is preferably selected from the group consisting of electrochromic device, switchable films, such as, LCDs (liquid crystal displays), or SPDs (suspended particle devices), photovoltaic cells, and/or display. More preferably, the electronic device is one more electrochromic devices. In a particular embodiment, the electronic device comprises 2 electrochromic devices.

In the preferred embodiment wherein the electronic device (7) is electrochromic device, such device comprises an ion conductor layer, a first electrode layer is on one side of and in contact with a first surface of ion conductor layer, and second electrode layer is on the other side of and in contact with a second surface of ion conductor layer. In addition, at least one of first and second, preferably both, electrode layers comprise electrochromic material. These layers are, in turn, arranged against the first and second substrates (5, 6). The first ion conductor layer is in electrical contact with one terminal of a power supply via a first bus bar and the second ion conductor layer is in electrical contact with the other terminal of a power supply via a second bus bar whereby the transmissivity of the electrochromic device may be changed by applying a voltage It is necessary to furnish an electric supply to the electronic device within the electronic laminate of the present invention. In some applications, it is also required to monitor the electronic device, through signal connection. Therefore, the electronic laminate comprises a plurality of terminals (8) electrically coupled to the electronic device. Terminals can include bus bars, voltage sense pads and/or sequestration pads.

In general, bus bars are formed on the first and second substrates (5, 6), to control electronic device. For example, an anode bus bar could be formed along or proximate to one edge of the second substrate (6). A cathode bus bar could be formed along or proximate to an opposite edge of the first substrate (5). One technique for depositing bus bars onto glass is to deposit down molten solder (e.g., a solder line) onto glass. In general, the anode bus bar and cathode bus bar are at or near opposed edges of the electronic device, and on opposed faces. In further embodiments, multiple bus bars could be located in various ways, for example to accommodate different shaped substrates or to establish multiple zones of control of the electronic device.

In some embodiments, terminals can be voltage sense pads. Voltage sense pads allow a voltage of the electronic device to be measured at one or more sense terminals. A controller is generally used to charge and discharge the electronic device reliably, repeatedly and without exceeding a safe operating realm for the device. Therefore, the controller can monitor a level of electric charge that is transferred to the electronic device, and also ensure that the potential of the electronic device does not exceed a predetermined safe operating limit. One or more sense voltage terminals located at certain spatial locations of the device would provide a measurement of the cell potential (i.e., voltage between the anode and cathode) of the device at those spatial locations. If the sense voltage limit is reached the driver can react to prevent the device from being damaged. Sense voltage terminals and driver operation are described in Publication No. US2016/0202590, and is incorporated by reference.

In the embodiments wherein the electronic device is an electrochromic device, the electronic laminate can further comprise terminals that may function as charge sequestration pads. The sequestration pads allow charge of the electrochromic device to be sequestered in a sequestration region, controlled by two sequestration terminals which act as bus bars for the sequestration region, or one sequestration terminal and one bus bar, or any other variations. In most circumstances, the device maintains charge neutrality, and charge is merely moved from one electrode to the other as the device switches. However, certain degradation mechanisms, can increase or decrease the total transportable charge in the device (e.g., spurious oxidation). This excess charge can be periodically eliminated via a sequestration process, wherein one or more redox elements located at certain spatial locations of the device would enable excess charge to be moved from within the device into the redox element. Sequestration terminals are electrically connected to the redox elements to enable separate control of the voltage and current applied to the redox element. Sequestration terminals and redox elements are described in Publication No. US2016/0202588 and are herein incorporated by reference.

As illustrated in FIGS. 3 to 5, the IGU (1) of the present invention comprises a cable harness (10) connected to the plurality of terminals (8) coupled to the electronic device (7) of the electronic laminate. Such cable harness ends with a male or female electric connector (11). The cable harness provides the electrical connection between the electronic laminate and the controller assembly, driver and/or the power supply.

The cable harness can be directly or indirectly connected to such terminals. When indirectly connected, the terminals such as the bus bars, sense voltage terminals, and/or sequestration terminals can be connected to a circuit board (23). The circuit board can include connector leads, which interface with a connector. The connector, in turn, provides the electrical connection to the controller assembly, driver and/or the power supply through the cable harness.

In some embodiments, the bus bars, sense voltage terminals, and/or sequestration terminals are directly connected to the circuit board. Some examples of direct connections between the terminals and the circuit board are soldered connections, ultrasonic welds, or conductive adhesive. In some embodiments, the terminals can be connected to a conductive member, which is connected to the circuit board. Some examples of conductive members are metallic ribbon, copper ribbon, flexible ribbon cables, and conductive wires. Some examples of how the conductive members can be connected to the terminals and the circuit boards are soldered connections, ultrasonic welds, or conductive adhesive.

The circuit boards described herein can be rigid or flexible. The circuit board substrate can be made from a rigid material such as woven fiberglass cloth impregnated with an epoxy resin, cotton paper impregnated with resin, aluminum, alumina, matte glass and polyester, or other rigid polymeric materials. Some examples of materials used in rigid circuit boards are FR-2, FR-4, G-10, CEM-1, CEM-2, PTFE, aluminum, and alumina.

In a preferred embodiment, as shown in FIGS. 3 to 5, when the plurality of terminals is electrically coupled to the cable harness via a circuit board (23), it is a flexible circuit board. The flexible circuit board is also well known as flexible printed circuit (FPC). In a more preferred embodiment, the flexible circuit board (23) comprises an extended portion (24) protruding out of the laminate edge (9) and comprising a free end (25). The extended portion of the flexible circuit board is flush with or recessed from the second pane edge (13). As depicted in FIGS. 3 to 5, the free end is located within a coupling volume (Rc). The coupling volume (Rc) has a rectangular cross-section normal to the second pane edge (13) and height, H, and is defined by the second pane (12) and the spacer (14). The circuit board substrate can be made from a flexible material such as, polyimide foil, polyimide-fluoropolymer composite foil, or other flexible polymeric materials. Some examples of materials used in flexible circuit boards Kapton and Pyralux.

In a preferred embodiment of the present invention, the free end (25) of the extended portion (24) of the flexible circuit board (23) is connected to the cable harness (10) through a second circuit board, preferably a rigid circuit board. The rigid circuit board substrate can be made from a rigid material such as woven fiberglass cloth impregnated with an epoxy resin, cotton paper impregnated with resin, aluminum, alumina, matte glass and polyester, or other rigid polymeric materials. Some examples of materials used in rigid circuit boards are FR-2, FR-4, G-10, CEM-1, CEM-2, PTFE, aluminum, and alumina. Preferably, the second circuit board is a rigid circuit board supporting a connector. Some examples of standard connector are ZIF connectors (zero insertion force connectors), hot bar solder connectors, and other types of flat flexible cable connectors. In some embodiments, the connector between the circuit board and the cable harness can be designed to fit in between the upper and lower substrate of the electrochromic device after assembly. The connector between the circuit board and the cable harness can be less than 5 mm thick, less 3 mm thick, or less than 1 mm thick.

In a preferred embodiment, the connector will be a Zero Insertion Force (ZIF) connector and more preferably a robust but bulkier ZIF connector. By robust ZIF connector, it is meant a ZIF connector with a retention force ≥7N, preferably with a retention force ≥9N, more preferably a connector with a retention force ≥10N. Such increased retention force can be brought by the addition of mechanical blocking sides notches. Other means to increase the retention of ZIF connectors is to increase the metallic coupling surface. Usual robust ZIF connectors will present a coupling width of 3 mm. Suitable robust ZIF connectors are sold by Hirose under the references FH33, FH52, FH40 or by Molex under the references 51296 and 505110.

The flexible circuit board and its extended portion, and/or second circuit board can be maintained in the coupling volume, Vc, by any fixing means such as gluing, preferably with a sealant material, more preferably the same sealant material that will be used for the secondary seal, snap-fitting, and/or by being embedded in a sealant material.

The gutter (15) of the IGU of the present invention, as shown in FIG. 2 comprises an open face (16) defined by a length, L, measured parallel to the longitudinal axis, X, a width, W, and a depth, D. Said open face extends along the length, L, and gives access to an inner volume, Vi. The gutter is suitable for receiving the male or female electric connector in the inner volume, Vi, preferably the male or female electric connector and a portion of the cable harness. The gutter is positioned within the interpane volume of the IGU, R, with the open face being recessed from, flush with or extending by less than 10 mm, preferably less than 6 mm, more preferably less than 2 mm, from the second pane edge.

Figure 1A:
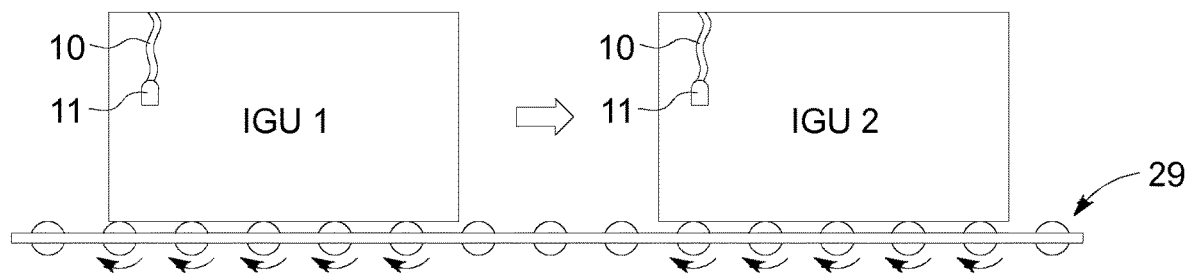
FIG. 1A shows an example of a manner in which an IGU comprising an electronic laminate, of the prior art, may be transported during fabrication and/or testing of the IGU.
Figure 1B:
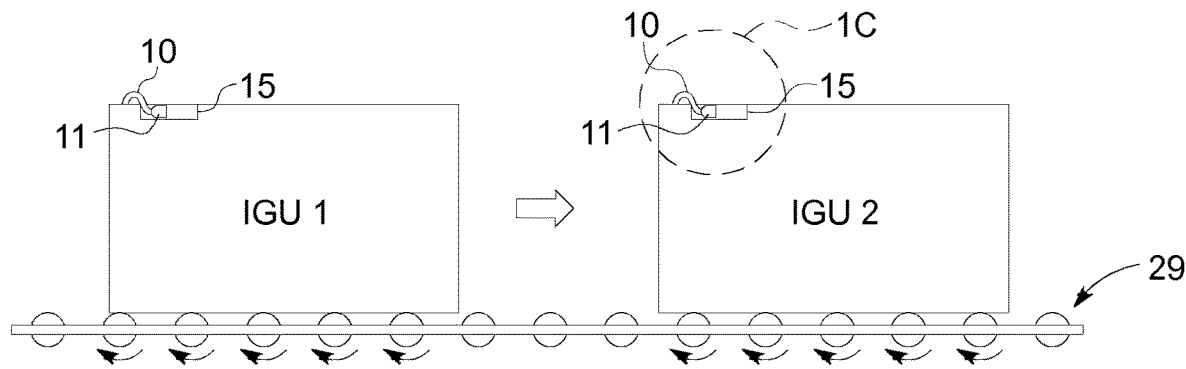
FIG. 1B shows an example of a manner in which an IGU comprising an electronic laminate, of the present invention, be transported during fabrication and/or testing of the IGU.
Figure 1C:
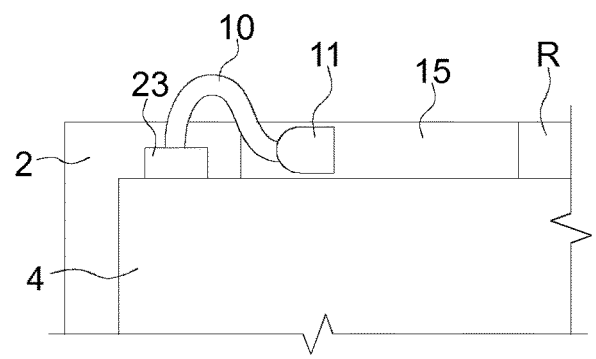
FIG. 1C shows an enlarged view of the top left corner of the IGU of FIG. 1B.
Figure 1D:
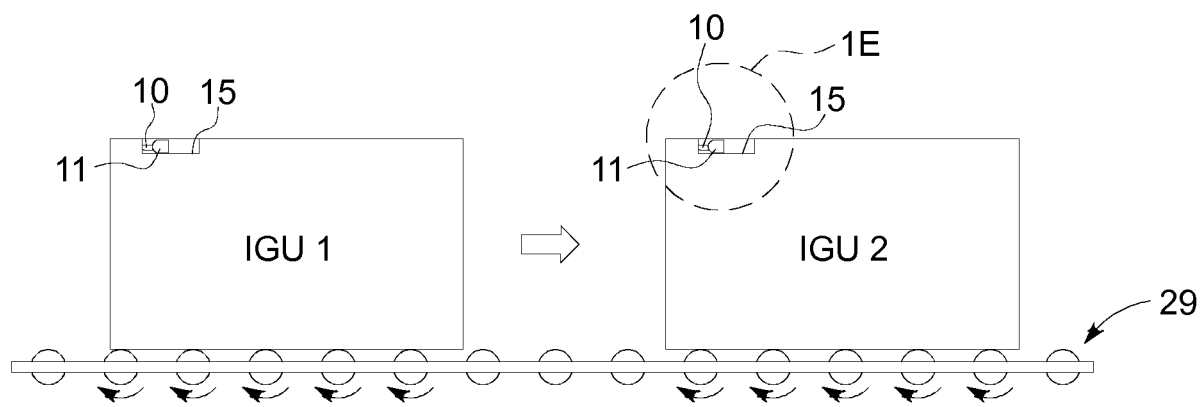
FIG. 1D shows another example of a manner in which an IGU comprising an electronic laminate, of the present invention, be transported during fabrication and/or testing of the IGU.
Figure 1E:
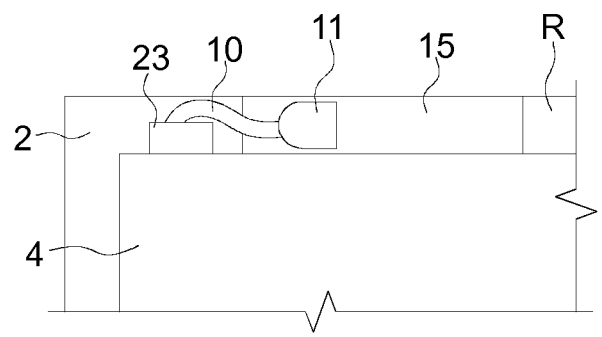
FIG. 1E shows an enlarged view of the top left corner of the IGU of FIG. 1D

It has been surprisingly found that positioning the male and/or female electric connector in the inner volume, Vi, preferably the male and/or female electric connector together with a portion of the cable harness, within the gutter located within the interpane volume, R, as depicted in FIG. 1B-C and in FIG. 1D-E, provides the required protection of the electric connector and/or cable harness, during production, handling and transport. It provides an easy, highly reliable and efficient production and transport processes. It has been further found that such positioning allows reducing the size of the connectics to be hidden by the window frame and hence to reduce the width of the frame and thereby maximizing the surface allocated to the glass and maximizing light.

In a preferred embodiment, the gutter has a polygonal or circular cross-section normal to the longitudinal axis, X; preferably a rectangular cross-section (FIG. 5B) or rectangular cross-section with beveled edges as illustrated in FIG. 3A. In another embodiment, the external surface of the gutter can be provided with protrusions and/or recesses. Indeed, it has been found that such specific cross section and/or protrusions and recesses provides better adhesion of the gutter within the sealant material of the IGU.

As it can be seen from FIG. 2, in a preferred embodiment, the male or female electric connector (11) occupies less than the half of the length, L, of the inner volume, Vi. In a further preferred embodiment, the gutter extends along the longitudinal axis, X, from a proximal end (17) to a distal end (18) wherein the proximal end comprises an opening (19) suitable for allowing the passage of the cable harness. Preferably, the distal end is closed. This design is advantageous since the dimension of the electric coupling between cable harnesses from the electronic laminate and from the controller assembly, driver and/or the power supply can also be limited. In this design, only the cable harness will need to exit the frame and therefore, the corresponding opening within the frame required for the passing cable can be significantly reduced. Indeed, it only the cable need to pass through and not the bulkier electric connector. Minimizing the opening hole within the window frame is significantly better to keep the watertightness, mechanical and thermal properties of the frame.

In order to maintain the watertightness and flexibility properties of the IGU of the present invention, the inner volume, Vi, of the gutter will preferably have a length, L, not exceeding 30% of the perimeter of the second pane and more preferably, be less than 50%, preferably less than 30%, more preferably less than 10% of the length of the second pane, L2.

The gutter can be made of any suitable material. They may be made of metal, e.g. steel, or made of a combination of plastics and metal or made of plastics with a preference to plastics to maintain the required flexibility of the secondary seal of the IGU of the present invention.

In another embodiment, the gutter can be maintained in the interpane volume, R, by a layer fixing means such as gluing, preferably with a sealant material, more preferably the same sealant material that will be used for the secondary seal, as illustrated in FIG. 4.

In another preferred embodiment, the open face (16) of the gutter can be closed by a closing mean. Such closing mean can be a rigid cover or preferably some sealing material as described above.

In a preferred embodiment, the interpane volume, R, is filled with a sealant material (20), embedding the external surface of the gutter. The sealant contacts the electronic laminate (4) and the first pane (2) to the second glass pane (12) as well as embeds the gutter (15). The spacer and the secondary sealant serve to connect the electronic device and first pane (2) to the second pane (12), while maintaining a thermally insulating space in between. There is also an additional effect of protecting the electronic device, from the environment. The secondary sealant could be silicone or any material with low water permeability such as polyvinylbutyral (PVB) or polyisobutylene (PIB).

Therefore, FIG. 3A illustrates an IGU of the present invention, comprising a glass sheet as the first pane (2) comprising a first pane edge (3), an electronic laminate (4) with a laminate edge (9), a flexible circuit board (23), a cable harness (10) connected to the terminals and ending with a male or female electric connector (11), a gutter (15), a spacer (14) and a glass sheet as the second pane (12) comprising a second pane edge (13). The electronic laminate (4) comprises a glass sheet as the first substrate (5), a glass sheet as the second substrate (6), an electronic device (7) provided between the first and second substrate. FIG. 3A shows a terminal (8) being a bus bar, a portion thereof being coupled to the electronic device. The laminate edge (9) is recessed with respect to the first pane edge (3). The first pane is laminated to the first substrate (5) of the electronic laminate with a polyvinyl butyral (PVB) layer (28). The flexible circuit board (23) is electrically coupled to at least a portion of the plurality of terminals (8) and comprises an extended portion (24) protruding out of the laminate edge (9) and free end (25). The second pane (12) is attached to a spacer (14) of height, H, measured normal to the second pane, maintaining a distance between the second pane (12) and the second substrate (6). Said spacer (14) is recessed with respect to the laminate edge (9) and the second pane edge (13). The extended portion (24) of the flexible circuit board (23) is recessed from the second pane edge (13). The free end (25) is located within the coupling volume (Rc). Such coupling volume has a rectangular cross-section normal to the second pane edge (13) and a height H and is defined by the second pane (12) and the spacer (14).

Figure 5A:
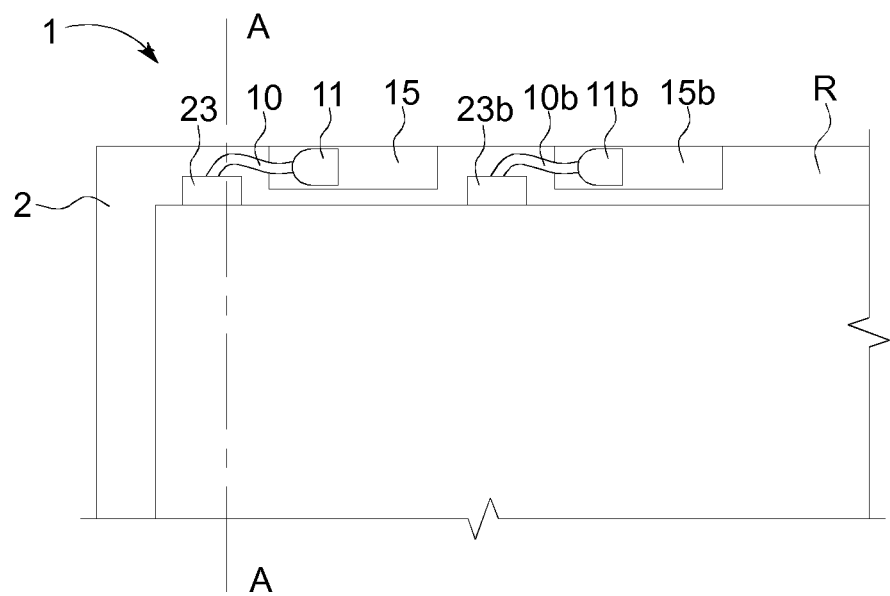
FIG. 5A is a schematic top view of an integrated glazing unit comprising two electronic laminates, each comprising a circuit board, a cable harness ending with a male or female electric connector and a gutter, in accordance with some embodiments.
Figure 5B:
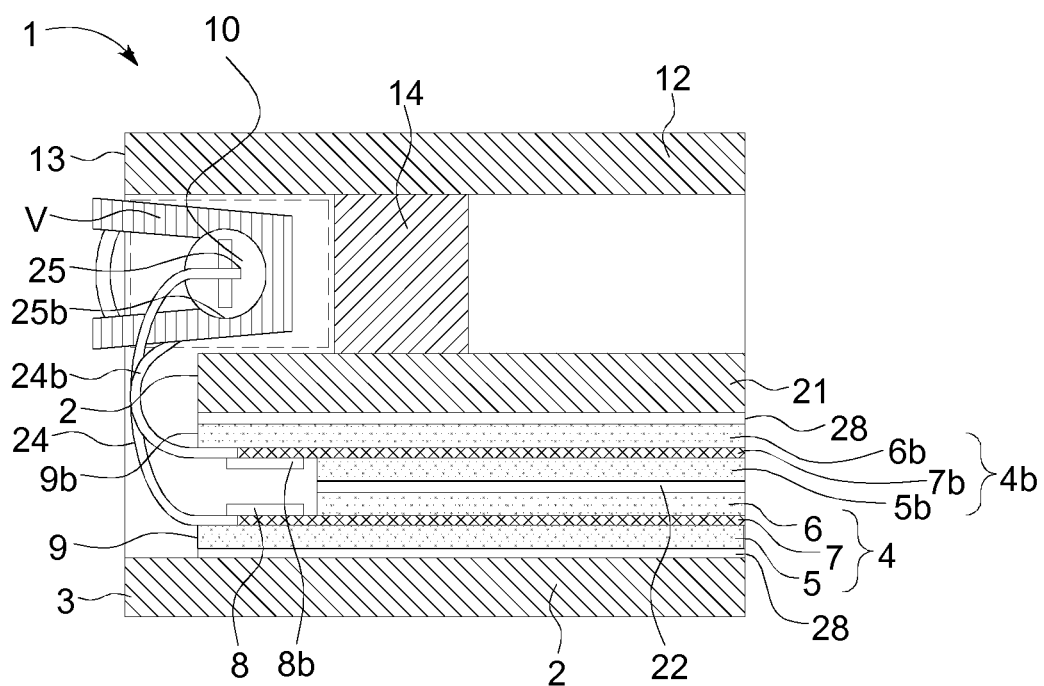
FIG. 5B is a schematic transverse view of FIG. 5A cut along A-A. It illustrates an integrated glazing unit comprising two electronic laminates having each a circuit board and a cable harness and its male of female electric connector located within a gutter; a spacer; two glass sheets in accordance with some embodiments.

In a preferred embodiment of the present invention as shown in FIG. 4 and in FIG. 5B, the electronic laminate edge (9) is step-shaped, at least a portion of the second substrate (6) being recessed relative to at least a portion of the first substrate (5), exposing at least a portion of the terminals (8) for electric connection. There are multiple embodiments for how the substrate (6) is offset from the other substrate (5) (and equivalently, vice versa). The two substrates (5,6) could be asymmetric, one relative to the other, and then assembled together as a lamination. The second substrate could be laser cut or otherwise cut before or after assembly to the first substrate. The two substrates could be cut to differing dimensions, e.g., the second substrate shorter than the first substrate. The offset creates an overhang or shelf, with one edge of the second substrate recessed from one edge of the first substrate and terminals that are exposed, i.e., not covered or otherwise obscured by the second substrate. The overhang or shelf could include an entire edge of the electronic device, or a portion of an edge, one or two corners (and a portion or entirety of an edge), or more than one edge, etc. It has been found that such recess allows the flexible circuit board (23) to better to connect to the exposed terminals (8).

The electronic laminate can be further attached or laminated to additional pieces of glass or plastic to be incorporated into different types of products. For example, an electronic laminate fabricated on a single sheet of glass, which is not heat strengthened or tempered, can be laminated to a second piece of tempered glass. This increases the strength of the IGU to tolerate the required stresses experienced in operation. By way of further example, an electronic laminate with electronic device disposed between two pieces of glass, which are not heat strengthened or tempered, can be laminated to a third piece of tempered glass, and that three piece of glass assembly can be then attached to a pane to form further an IGU. In a preferred embodiment, the third pane has the same length than the second substrate.

Indeed, it has been found that such additional third pane can be beneficial when the second substrate of the electronic laminate does not have the required mechanical properties (e.g., is not thick enough) to support the spacer and the second pane (12). As further illustrated in FIGS. 4 and 5A, the integrated glazing unit (IGU) of the present invention comprises a third pane (21) interposed between the electronic laminate and the second pane (12), the second (12) and third (21) panes being separated by the spacer (14).

As shown in FIGS. 4 and 5B as a preferred embodiments of the present invention, the IGU further comprises a third pane (21), preferably a glass sheet, located between the second substrate (6) of the electronic laminate (4) and the spacer (14). This third pane is preferably attached with thermoplastic interlayer (28), preferably a polyvinyl butyral layer. The edge (22) of such third pane is recessed with respect to the first pane edge. In a preferred embodiment, the third pane edge (22) is aligned with the laminate edge (9), preferably has same length than the second substrate (6) of the electronic laminate (4).

In a further embodiment, one or more electronic laminates can be laminated together, and laminated to one or more pieces of pane, preferably glass sheets. Such electronic laminates can be the same one or of different technologies. The integrated glazing unit can further comprise N electronic laminates, with N>1, each comprising: a first substrate, a second substrate, an electronic device provided between the first and second substrate, a plurality of terminals coupled to the electronic device, and a laminate edge extending being parallel to and recessed with respect to an adjacent edge of the first pane edge. The N electronic laminates are positioned between the first electronic laminate and the second pane. The IGU will further comprise N cable harnesses connected to corresponding terminals of the N electronic laminate and each ending with a Nth male or female electric connector, and N gutters as defined above, each gutter comprising an open face defined by a length, L, measured parallel to an adjacent edge of the first pane and suitable for receiving the corresponding Nth male or female electric connectors. There will be preferably a corresponding number of flexible circuit board, preferably with an extended portion being flush with or recessed from the second pane edge and located within the coupling volume.

FIG. 5A shows a top view of an integrated glazing unit comprising two electronic laminates, each comprising a circuit board (23 and 23b) electrically coupled to a cable harness (10 and 10b) and ending with a male of female electric connector (11 and 11b). Each male of female electric connector and portion of the cable harness is positioned within a separate gutter (15 and 15b) being flush with the second pane edge (12).

In the embodiment wherein N=2, the first pane (2) may be laminated to a first electronic laminate (7), and the second pane (12) may be laminated to a second electronic laminate (7). In another embodiment, a first and a second electronic laminate may be laminated to one another to form a multi-pane electronic stack and then laminated to either the first pane (2) or the second pane (12). In this dual pane embodiment, the two electronic laminates may alternatively be laminated between two carrier glass substrates where one of the two carrier glass substrates may be the first pane (2) or the second pane (12). In case of electrochromic laminates, this arrangement allows lower light transmission in the fully darkened state, i.e., when both electrochromic devices are darkened.

The first electronic laminate (4) comprises a first substrate (5), a second substrate (6), an electronic device (7) provided between the first and second substrate, a plurality of terminals (8) coupled to the electronic device, a laminate edge (9) recessed with respect to the first pane edge. The first substrate of the electronic laminate is attached to the first pane. Similarly, the second electronic laminate (4b) comprises as well a first substrate (5b), a second substrate (6b), an electronic device (7b) provided between the first and second substrate, a plurality of terminals (8b) coupled to the electronic device, a laminate edge (9b) recessed with respect to the first pane edge. The first substrate (5b) of the second electronic laminate (4b) is attached to the second substrate (6) of the first electronic laminate (4).

In a preferred embodiment, the material of the first substrate (5) of the first electronic laminate (4) is the same material than the second substrate (6b) of the second electronic laminate (4b). In a preferred embodiment, the material of the second substrate (6) of the first electronic laminate (4) is the same material than the first substrate (5b) of the second electronic laminate (4b). This symmetric laminated assembly can be advantageous to reduce or eliminate bowing during lamination. Not to be limited by theory, bowing may occur when there are materials with different coefficients of thermal expansion in an asymmetric assembly such that the expansion and contraction of one side of the assembly is different from the opposing side of the assembly leading to residual stress and bowing.

In a further embodiment, the electronic laminates could be further laminated to a third pane, as described above.

According to FIG. 5B, the IGU comprises a first pane (2), preferably glass sheet, attached to the first substrate (5) of the electronic laminate (4) by a layer of PVB (28). The first electronic laminate (4) is attached to the first substrate (5b) of the second electronic laminate (4b) by a layer of PVB (28). The IGU further comprises a second pane (12), preferably a glass sheet, attached to a spacer (14) maintaining a distance between the second pane (12) and the second substrate (6b) of the second electronic laminate (4b). In the illustrated embodiment, the IGU further comprises a glass sheet as the third pane (21) located between the second substrate (6b) of the second electronic laminate (4b) and the spacer (14). This third pane is preferably attached with thermoplastic interlayer (28), preferably a polyvinyl butyral layer. The edge (22) of such third pane is recessed with respect to the first pane edge (3). The third pane edge (22) has same length than the second substrate (6) of the electronic laminate (4). The spacer (15) is recessed with respect to the laminate edge and the second pane edge.

The laminate edge (9) of the first electronic laminate (4) is step-shaped in that at least a portion of the second substrate (6) being recessed relative to at least a portion of the first substrate (5), exposing at least a portion of the terminals (8) for electric connection. Similarly, the laminate edge (9b) of the second electronic laminate (4b) is step-shaped in that at least a portion of the first substrate (5b) being recessed relative to at least a portion of the second substrate (6b), exposing at least a portion of the terminals (8) for electric connection.

The terminals (8 and 8b) of each electronic laminate are connected to the cable harness (10 and 10b) via flexible circuit boards (23 and 23b) and a connector (27 and 27B). The extended portion (24, 24b) of both flexible circuit boards (23, 23b) is flush with or recessed from the second pane edge (12). The free end (25, 25b) of the extended portion of both flexible circuit boards is located within the coupling volume (Rc). Each male of female electric connector and portion of the cable harness is positioned within a separate gutter (15 and 15b) being flush with the second pane edge (12). FIG. 5B depicts only the cable harness, male or female electric connector and gutter of the first electronic laminate.

The present invention further relates to a method of producing an integrated glazing unit (IGU) to the present invention. Such method comprises laminating the electronic device (7) to the first substrate (5) and second substrate (6); attaching the electronic laminate (4) to the first pane (2); attaching the second pane (13), to the spacer (15) for maintaining a distance between the second pane (13) and the second substrate (6); connecting the cable harness (10) to at least a portion of the terminals (8) of the electronic laminate (4); positioning the gutter within the interpane volume, R, by pressing the gutter into the sealing material (20) before it has set, such that gutter is recessed from, flush with or extending by less than 10 mm, preferably less than 6 mm, more preferably less than 2 mm from the second pane edge; positioning the electric connector, preferably with a portion of the cable harness, into the inner volume, Vi; and filling the interpane volume with a sealing material.

Thus, thanks to the present invention, the male or female electric connector is protected during all the process of manufacturing and particularly during the time needed for the sealant curing.

In a preferred embodiment, the method further comprises the step of partially filling the interpane volume with a sealing material before positioning the gutter within the interpane volume, by pressing the gutter into the sealing material before it has set.

In a further preferred embodiment, the method further comprises the step of filling the inner volume, Vi, of the gutter with a sealing material.

| Ref.# | Feature |
|---|---|
| 1 | Integrated glazing unit |
| 2 | First pane |
| 3 | First pane edge |
| 4 | Electronic laminate |
| 5 | First Substrate of the Electronic laminate |
| 6 | Second Substrate of the Electronic laminate |
| 7 | Electronic device |
| 8 | Terminal |
| 9 | Laminate edge |
| 10 | Cable harness |
| 11 | Male or female electric connector |
| 12 | Second pane |
| 13 | Second pane edge |

-continued

| Ref.# | Feature |
|---|---|
| 14 | Spacer |
| 15 | Gutter |
| 16 | Open Face of the Gutter |
| 17 | Proximal end of the Gutter |
| 18 | Distal end of the Gutter |
| 19 | Opening of the Proximal end |
| 20 | Sealant material |
| 21 | Third pane |
| 22 | Third pane edge |
| 23 | Circuit board |
| 24 | Extended portion of the circuit board |
| 25 | Free end of the Extended portion of the circuit board |
| 26 | Second circuit board |
| 27 | Connector |
| 28 | Thermoplastic interlayer |
| 29 | Transport system |
| 4b | Second electronic laminate |
| 5b | First Substrate of the Second electronic laminate |
| 6b | Second Substrate of the Second electronic laminate |
| 7b | Electronic device of the Second electronic laminate |
| 8b | Terminal of the Second electronic laminate |
| 10b | Cable harness of the Second electronic laminate |
| 11b | Male or female electric connector of the Second electronic laminate |
| 15b | Gutter of the Second electronic laminate |
| 23b | Circuit board of the Second electronic laminate |
| 27b | Connector of the Second electronic laminate |
| Vi | Inner volume of the Gutter |
| R | Interpane volume |
| Rc | Coupling volume having a rectangular cross-section normal to the second pane edge and a height H and defined by the second pane and the spacer |
| H | Height of the Spacer measured normal to the second pane |

The invention claimed is:

1. An integrated glazing unit (IGU), comprising: (a) a first pane comprising a first pane edge, extending along a longitudinal axis, X; (b) an electronic laminate comprising: a first substrate, a second substrate, an electronic device provided between the first and second substrate, a plurality of terminals coupled to the electronic device, a laminate edge extending along the longitudinal axis X and being recessed with respect to the first pane edge; and wherein the first substrate is attached to the first pane; (c) a cable harness connected to the terminals and ending with a male or female electric connector; (d) at least a second pane comprising a second pane edge extending along the longitudinal axis, X, and coupled to the electronic laminate by a spacer maintaining a distance between the electronic laminate and the second pane, said spacer being recessed with respect to the laminate edge and the second pane edge, forming an interpane volume, R, between the first and second panes; and (e) a gutter: comprising an open face defined by a length, L, measured parallel to the longitudinal axis, X, a width, W, and a depth, D; said open face extending along the length, L, and giving access to an inner volume, Vi; and being positioned within the interpane volume, R, with the open face being recessed from, flush with or extending by less than 10 mm, wherein the gutter is suitable for receiving the male and/or female electric connector in the inner volume.

2. The integrated glazing unit according to claim 1, wherein the gutter further comprises a portion of the cable harness.

3. The integrated glazing unit according to claim 1, wherein the gutter has a polygonal or circular cross-section normal to the longitudinal axis, X.

4. The integrated glazing unit according to claim 3, wherein the gutter has a rectangular cross-section with beveled edges normal to the longitudinal axis, X.

5. The integrated glazing unit according to claim 1, wherein the gutter comprises an external surface provided with protrusions and/or recesses.

6. The integrated glazing unit according to claim 1, wherein the male or female electric connector occupies less than the half of the length, L, of the inner volume, Vi.

7. The integrated glazing unit according to claim 1, wherein the gutter extends along the longitudinal axis, X, from a proximal end to a distal end wherein the proximal end comprises an opening suitable for allowing the passage of the cable harness.

8. The integrated glazing unit according to claim 1, wherein the second pane has a length, L2, measured along the longitudinal axis, X, and wherein the length, L, of the inner volume, Vi of the gutter is less than 50% length of the second pane, L2.

9. The integrated glazing unit according to claim 1, wherein the interpane volume is filled with a sealant material, embedding an external surface of the gutter.

10. The integrated glazing unit according to claim 1, wherein the electronic laminate further comprises:
a first transparent conductive layer on the first substrate;
a first bus bar applied to the first substrate and the first transparent conductive layer;
an active electronic material layer;
a second transparent conductive layer on the second substrate;
a second bus bar applied to the second substrate and the second transparent conductive layer.

11. The integrated glazing unit according to claim 1, wherein the laminate edge is step-shaped, at least a portion of the second substrate being recessed relative to at least a portion of the first substrate, exposing at least a portion of the terminals for electric connection.

12. The integrated glazing unit according to claim 11, wherein the third pane has a same length as the second substrate.

13. The integrated glazing unit according to claim 1, wherein the electronic device is selected from the group consisting of electrochromic, Suspended Particles Devices, Liquid Crystal Displays, photovoltaic cells, and/or displays.

14. The integrated glazing unit according to claim 13, wherein the electronic device is an electrochromic device.

15. The integrated glazing unit according to claim 1, further comprising: i. N number of electronic laminates, with N>1, each comprising: a first substrate, a second substrate, an electronic device provided between the first and second substrate, a plurality of terminals coupled to the electronic device, a laminate edge extending parallel to and recessed with respect to an adjacent edge of the first pane edge; and positioned between the electronic laminate and the second pane, ii. N number of cable harnesses connected to corresponding terminals of the N number of electronic laminates and each ending with a Nth male or female electric connector, and iii. N number of gutters, each gutter comprising an open face defined by a length, L, measured parallel to an adjacent edge of the first pane and suitable for receiving corresponding Nth male or female electric connectors.

16. The integrated glazing unit according to claim 1, wherein the first pane and second pane are glass sheets.

17. The integrated glazing unit according to claim 16, wherein the first substrate and second substrate are glass sheets.

18. The integrated glazing unit according to claim 1, further comprising a third pane, located between the second substrate and the spacer, said third pane comprising a third pane edge recessed with respect to the first pane edge.

19. A method of producing an integrated glazing unit (IGU) according to claim 1, comprising:
- laminating the electronic device to the first substrate and second substrate;
- attaching the electronic laminate to the first pane,
- attaching the second pane, to the spacer for maintaining a distance between the second pane and the second substrate;
- connecting the cable harness to at least a portion of the terminals of the electronic laminate;
- positioning the gutter within the interpane volume, R, by pressing the gutter into the sealing material before it has set, such that the gutter is recessed from, flush with or extending by less than 10 mm from the second pane edge;
- positioning the electric connector, into the inner volume, Vi; and
- filling the interpane volume with a sealing material.

20. The method of producing an integrated glazing unit (IGU) according to claim 19, further comprising:
- partially filling the interpane volume with a sealing material before positioning the gutter within the interpane volume, by pressing the gutter into the sealing material before it has set, such that the gutter is recessed from, flush with or extending by less than from the second pane edge.

* * * * *